(12) United States Patent
Kameoka et al.

(10) Patent No.: US 12,269,557 B2
(45) Date of Patent: Apr. 8, 2025

(54) GRIP AND HANDLEBAR HAVING GRIP

(71) Applicants: FALTEC Co., Ltd., Kawasaki (JP); HONDA MOTOR CO., LTD., Tokyo (JP)

(72) Inventors: Tetsuo Kameoka, Kawasaki (JP); Haruki Horikawa, Tokyo (JP); Daiki Hamaguchi, Tokyo (JP)

(73) Assignees: FALTEC Co., Ltd., Kawasaki (JP); HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 18/613,189

(22) Filed: Mar. 22, 2024

(65) Prior Publication Data

US 2024/0326948 A1 Oct. 3, 2024

(30) Foreign Application Priority Data

Mar. 28, 2023 (JP) ................. 2023-051489

(51) Int. Cl.
*B62K 21/26* (2006.01)
(52) U.S. Cl.
CPC .................... *B62K 21/26* (2013.01)
(58) Field of Classification Search
CPC ....................................... B62K 21/26
See application file for complete search history.

(56) References Cited

U.S. PATENT DOCUMENTS

| | | | |
|---|---|---|---|
| 6,419,601 B1 * | 7/2002 | Kenner | A63B 71/141 81/177.1 |
| 11,572,125 B1 * | 2/2023 | Hoglund | F16B 2/065 |
| 2007/0039407 A1 * | 2/2007 | Wu | B62K 21/26 74/543 |
| 2024/0083541 A1 * | 3/2024 | Stoltz | B25G 1/102 |

FOREIGN PATENT DOCUMENTS

| | | | |
|---|---|---|---|
| EP | 1972535 B1 * | 9/2010 | B62K 21/26 |
| JP | 08-198169 | 8/1996 | |
| JP | 3586492 B2 * | 11/2004 | |
| JP | 2023043685 A * | 3/2023 | |

OTHER PUBLICATIONS

Translation of JP-3586492-B2, Matsuyama, Nov. 10, 2004 (Year: 2004).*
Translation of JP 2023043685 A, Mokudi, Mar. 29, 2023 (Year: 2023).*

* cited by examiner

*Primary Examiner* — Vinh Luong
(74) *Attorney, Agent, or Firm* — Amin, Turocy & Watson, LLP

(57) ABSTRACT

A grip according to the present invention is equipped with a tubular shaped member inserted onto a handlebar, and a cover member that covers the tubular shaped member. An inner circumferential surface of the tubular shaped member has a shape of an ellipse, a through hole through which a fixing member for fixing the handlebar and the tubular shaped member is inserted is formed in the tubular shaped member, and the through hole extends in a direction of a minor axis of the ellipse.

7 Claims, 6 Drawing Sheets

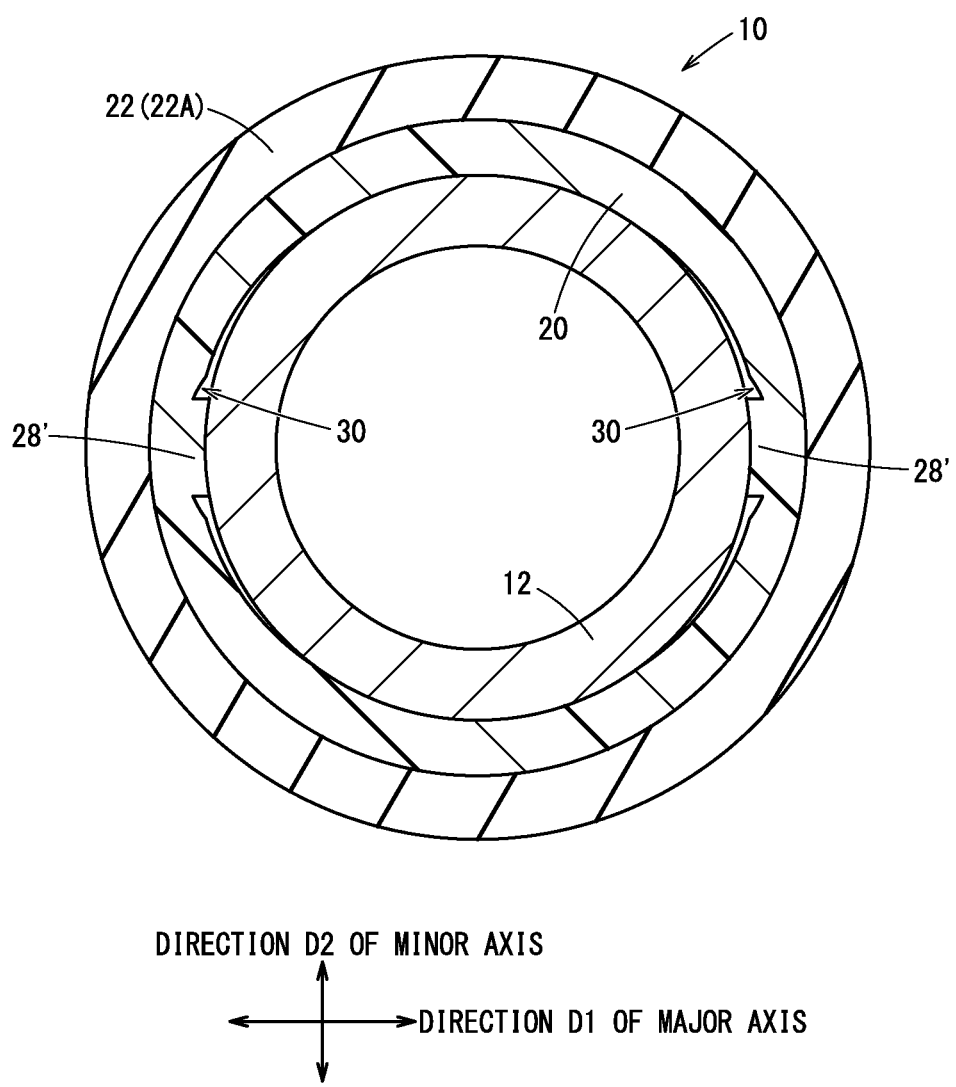

GRIP AND HANDLEBAR HAVING GRIP

CROSS-REFERENCE TO RELATED APPLICATIONS

This application is based upon and claims the benefit of priority from Japanese Patent Application No. 2023-051489 filed on Mar. 28, 2023, the contents of which are incorporated herein by reference.

BACKGROUND OF THE INVENTION

Field of the Invention

The present invention relates to a grip and a handlebar having such a grip.

Description of the Related Art

Generally, grips are installed on the handlebars of motorcycles and the like. In JP H08-198169 A, it is described that, in order to improve the ease in assembling the grip onto the handlebar, a large number of through holes are formed in the grip to thereby reduce frictional resistance. Further, in JP H08-198169 A, it is described that, in order to improve the ease in assembling the grip onto the handlebar, a liquid adhesive is applied as a lubricant between an inner circumferential surface of the grip and the handlebar.

SUMMARY OF THE INVENTION

In general, it is desired to solve the problem of difficulty in installing the grip on the handlebar. Further, it is also desired to solve the problem of the grip coming off after having been installed on the handlebar.

The present invention has the object of solving the aforementioned problems.

One aspect of the present invention is characterized by a grip, comprising a tubular shaped member inserted onto a handlebar, and a cover member configured to cover the tubular shaped member, wherein, in a cross section perpendicular to a longitudinal direction of the tubular shaped member, an inner circumferential surface of the tubular shaped member has a shape of an ellipse, a through hole through which a fixing member configured to fix the handlebar and the tubular shaped member is inserted is formed in the tubular shaped member, and the through hole extends in a direction of a minor axis of the ellipse.

Further, another aspect of the present invention is characterized by a handlebar equipped with a grip on which the aforementioned grip is installed.

According to the present invention, owing to the elliptical shape, a portion (a short diameter portion) that strongly contacts the handlebar, and a portion (a long diameter portion) that allows deformation at a time of assembly are provided. In accordance therewith, it is possible to realize a grip that can be easily installed on the handlebar, and that can maintain the state of being installed on the handlebar.

The above and other objects, features, and advantages of the present invention will become more apparent from the following description when taken in conjunction with the accompanying drawings, in which a preferred embodiment of the present invention is shown by way of illustrative example.

BRIEF DESCRIPTION OF THE DRAWINGS

FIG. 6 is a cross-sectional view showing an exemplary modification of protruding parts.

DETAILED DESCRIPTION OF THE INVENTION

Embodiment

Figure 1:
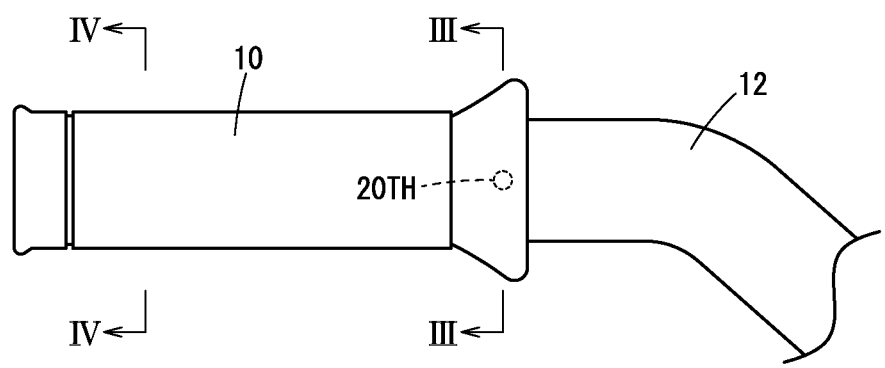
FIG. 1 is a diagram showing a state in which a grip according to the present embodiment is installed on a handlebar.

As shown in FIG. 1, a handlebar having a grip according to the present embodiment is equipped with a grip 10 and a handlebar 12. The grip 10 is installed on the handlebar 12. The handlebar 12 is provided on a moving object, a handcart, a working machine, or the like. As the moving object, for example, there may be cited a motorcycle, a bicycle, a buggy, or the like. As the handcart, for example, there may be cited a one-wheeled vehicle or the like. As the working machine, there may be cited a lawn mower or the like.

Figure 2:
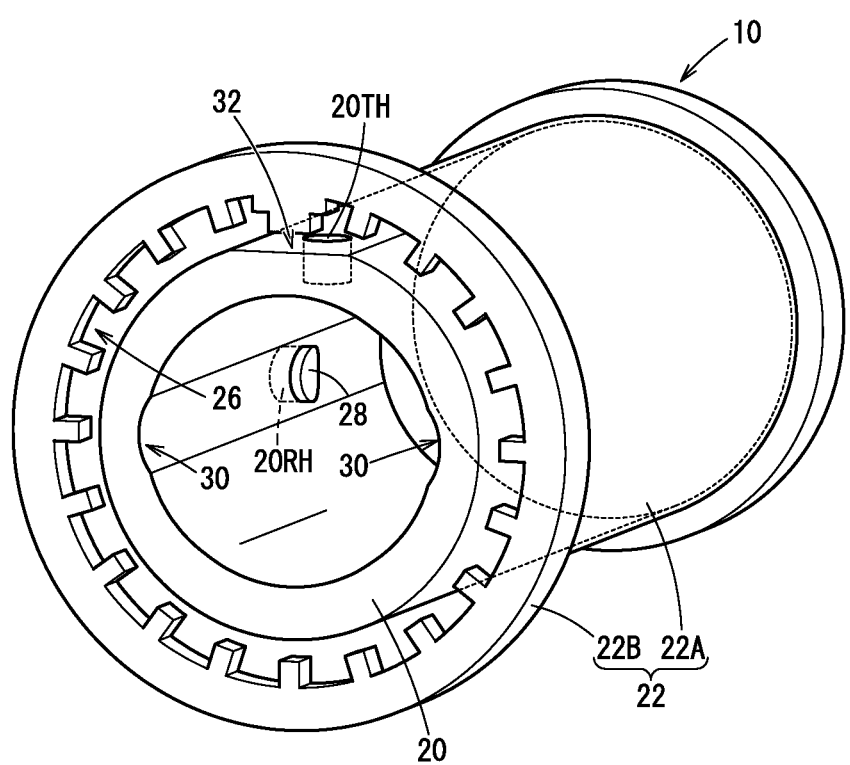
FIG. 2 is a perspective view showing the grip.

As shown in FIG. 2, the grip 10 is equipped with a tubular shaped member 20 and a cover member 22. The tubular shaped member 20 is an inner portion of the grip 10. The tubular shaped member 20, for example, is formed by a thermoplastic resin. The tubular shaped member 20 is inserted onto the handlebar 12.

The cover member 22 is an outer portion of the grip 10. The cover member 22, for example, is formed by rubber. The cover member 22 covers the tubular shaped member 20. The cover member 22 is attached to the tubular shaped member 20 in a manner so as to be incapable of moving relatively with respect to the tubular shaped member 20. The length of the cover member 22 in the direction in which the cover member 22 extends is greater than the length of the tubular shaped member 20 in the direction in which the tubular shaped member 20 extends.

The cover member 22 includes a cover main body portion 22A and a separated portion 22B. The cover main body portion 22A is a pipe shaped portion that is in contact with an outer circumferential surface of the tubular shaped member 20. The separated portion 22B is a portion that is separated away from the tubular shaped member 20 at one end part of the tubular shaped member 20. The separated portion 22B extends in a manner so as to spread out radially from the cover main body portion 22A toward the one end part of the tubular shaped member 20. The outer shape of the separated portion 22B is larger than the outer shape of the cover main body portion 22A. For example, the outer shape of the separated portion 22B is a truncated conical shape. Concave and convex irregularities 26 are formed on the inner circumferential surface of the separated portion 22B. The separated portion 22B is not in contact with the outer circumferential surface of the tubular shaped member 20, and is capable of being turned up.

The cover member 22 includes protruding parts 28 that project out from the inner circumferential surface of the cover member 22 at another end part of the tubular shaped member 20. The protruding parts 28 penetrate through respective protrusion insertion holes 20RH formed in the tubular shaped member 20, and extend to the inner side of the tubular shaped member 20.

Figure 3:
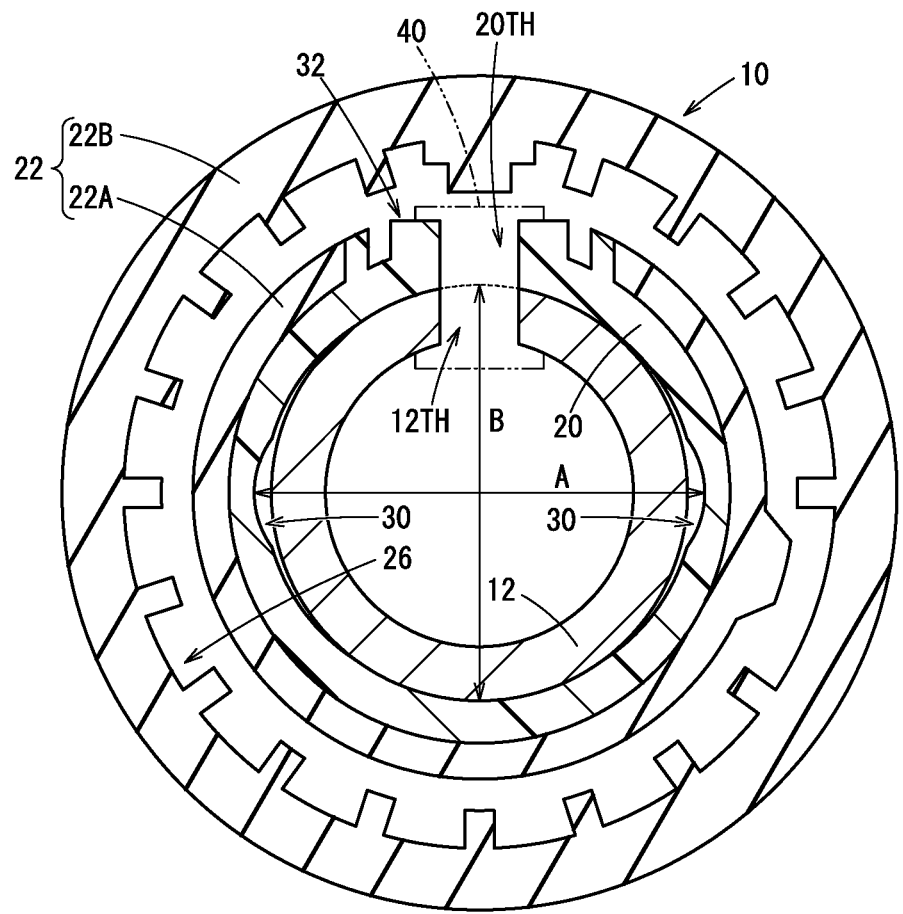
FIG. 3 is a cross-sectional view taken along line III-III of FIG. 1.
Figure 3:

As shown in FIG. 3, in a cross section perpendicular to the longitudinal direction of the tubular shaped member 20 (the direction in which the tubular shaped member 20 extends), the inner circumferential surface of the tubular shaped member 20 is formed in a generally elliptical shape. A pair of concave portions 30 are formed in the inner circumferential surface of the tubular shaped member 20. In the case that the pair of concave portions 30 were not formed therein, the inner circumferential surface of the tubular shaped member 20 would be substantially in the form of a true ellipse. A length A of a major axis of the ellipse is greater than a length B of a minor axis of the ellipse (A>B). Moreover, the pair of concave portions 30 may be formed in the inner circumferential surface of a perfect circle, in a manner so that the shape of the inner circumferential surface becomes a generally elliptical shape as a whole.

The pair of concave portions 30 are each positioned on an inner surface portion of the tubular shaped member 20 in a direction D1 of the major axis of the ellipse. The pair of concave portions 30 are arranged so as to face each other. As shown in FIG. 2, each of the pair of concave portions 30 extends from one end part to the other end part of the tubular shaped member 20 along the longitudinal direction of the tubular shaped member 20. The aforementioned protrusion insertion holes 20RH are provided respectively on the pair of concave portions 30.

As shown in FIG. 3, in the cross section perpendicular to the longitudinal direction of the tubular shaped member 20, the outer circumferential surface of the tubular shaped member 20 is formed in a generally circular shape. A flat portion 32 is formed on the outer circumferential surface of the tubular shaped member 20. In the case that the flat portion 32 were not formed therein, the outer circumferential surface of the tubular shaped member 20 would be substantially in the form of a perfect circle.

A through hole 20TH is formed in the tubular shaped member 20. The through hole 20TH is positioned at the one end part of the tubular shaped member 20. The through hole 20TH extends in a direction D2 of the minor axis of the ellipse. The through hole 20TH opens on the flat portion 32 of the outer circumferential surface of the tubular shaped member 20. The flat portion 32 serves as a base for a fixing member 40 that is inserted into the through hole 20TH. The fixing member 40 is a member for fixing the tubular shaped member 20 to the handlebar 12. According to the present embodiment, the fixing member 40 is a rivet, however, the present embodiment is not necessarily limited to this feature. For example, the fixing member 40 may be a screw, a bolt, or the like. Moreover, it should be noted that the through hole 20TH becomes exposed in the case that the separated portion 22B of the cover member 22 is turned up.

A bar through hole 12TH is formed in the handlebar 12 corresponding to the through hole 20TH of the tubular shaped member 20. The fixing member 40, which is inserted into the through hole 20TH of the tubular shaped member 20, is inserted into the bar through hole 12TH.

Figure 4:
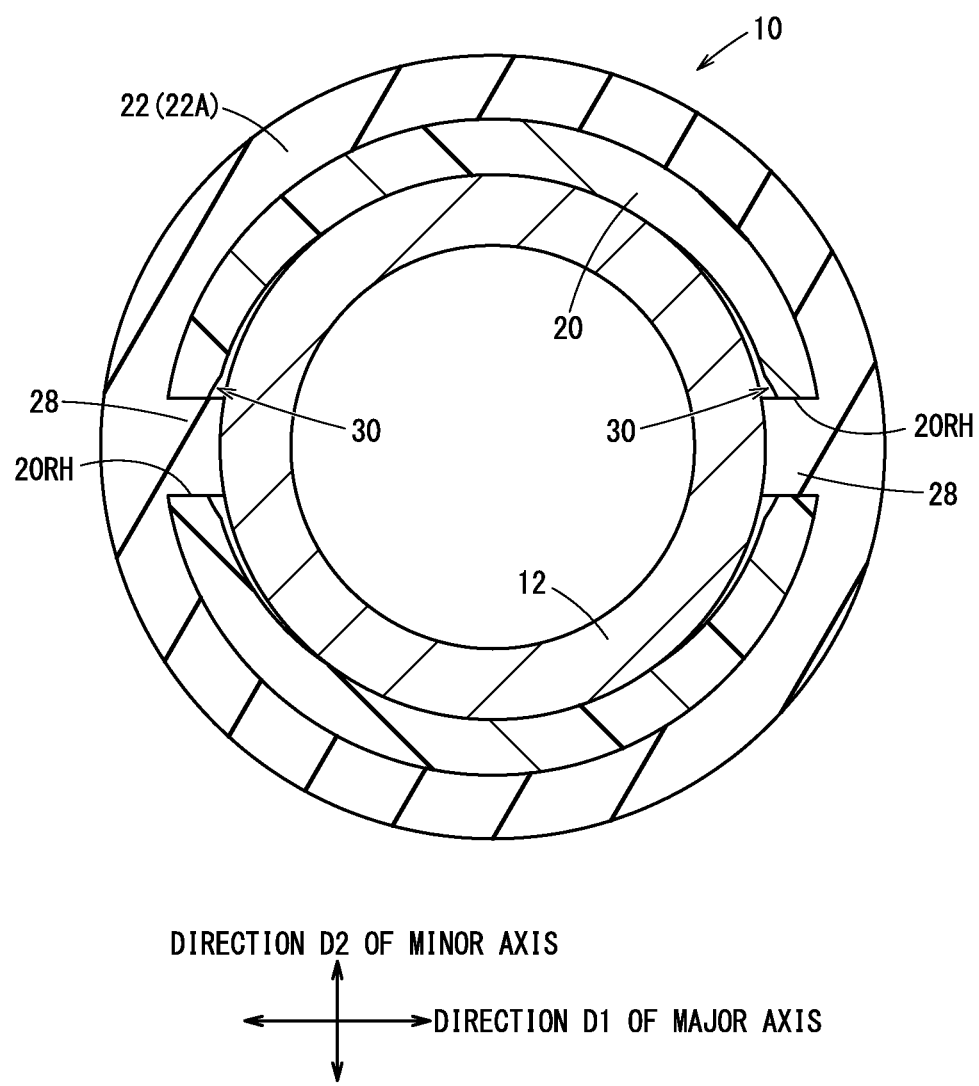
FIG. 4 is a cross-sectional view taken along line IV-IV of FIG. 1.

As shown in FIG. 4, the protrusion insertion holes 20RH are formed in the tubular shaped member 20. As noted previously, the protrusion insertion holes 20RH are positioned in the pair of concave portions 30 at the other end of the tubular shaped member 20. The protrusion insertion holes 20RH extend in the direction D1 of the major axis of the ellipse. The protruding parts 28 of the cover member 22 are inserted through the protrusion insertion holes 20RH.

Figure 5:
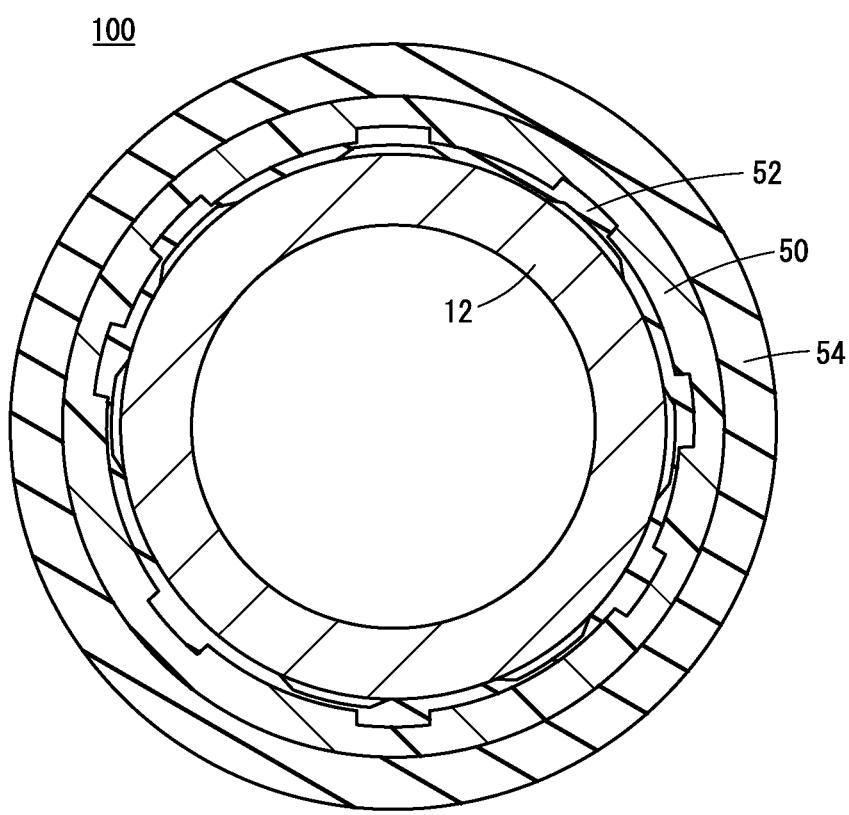
FIG. 5 is a cross-sectional view showing a grip according to a comparative example.

FIG. 5 is a cross-sectional view showing a grip 100 according to a comparative example. The grip 100 according to the comparative example is constituted by a circular pipe member 50 made of a resin, a ring member 52 made of rubber, and a cover member 54 made of rubber. The ring member 52 is attached to an inner circumferential surface of the circular pipe member 50. The cover member 54 is attached to an outer circumferential surface of the circular pipe member 50. Concave portions and convex portions are formed in an inner circumferential surface of the ring member 52 in the circumferential direction.

In the case that the grip 100 of the comparative example is installed on the handlebar 12, the operator inserts the ring member 52 onto the handlebar 12. When the ring member 52 is inserted onto the handlebar 12, the grip 100 presses the outer circumferential surface of the handlebar 12. Due to such a pressing force, the attachment strength between the handlebar 12 and the grip 100 is maintained.

Manufacturing errors may occur in the grip 100. For example, as a height of the convex portion of the ring member 52 approaches an upper limit of a tolerance range, then at a time when the ring member 52 is inserted onto the handlebar 12, frictional resistance between the handlebar 12 and the ring member 52 increases. Similarly, as an outer diameter of the handlebar 12 approaches an upper limit of a tolerance range, frictional resistance between the handlebar 12 and the ring member 52 also increases. Accordingly, it becomes necessary for the operator to forcefully push the grip 100. As a result, the operation of installing the grip cannot be carried out smoothly.

On the other hand, as the height of the convex portion of the ring member 52 approaches a lower limit of the tolerance range, the contact area between the handlebar 12 and the ring member 52 becomes smaller, and the aforementioned pressing force becomes smaller. Similarly, as the outer diameter of the handlebar 12 approaches a lower limit of the tolerance range, the aforementioned pressing force becomes smaller. Accordingly, it becomes difficult to maintain the attachment strength.

In the case that the attachment strength becomes difficult to maintain, then in order to supplement the attachment strength, it may be considered to apply an adhesive to the inner circumferential surface of the ring member 52, and thereafter, to insert the ring member 52 onto the handlebar 12.

However, the amount of the adhesive to be applied, or alternatively, the range over which the adhesive is applied, tends to depend on the skill of the operator. Therefore, depending on the level of skill of the operator, unevenness may occur in the adhesive that is applied between the handlebar 12 and the grip 100, and lack of uniformity may occur in the attachment strength.

In contrast thereto, according to the present embodiment, the inner circumferential surface of the tubular shaped member 20 that is inserted onto the handlebar 12 is formed in an elliptical shape. Therefore, in a long diameter portion (a major axis portion) of the tubular shaped member 20, the contact surface between the tubular shaped member 20 and the handlebar 12 in the direction D1 of the major axis can be made smaller. Accordingly, even if at least one of the outer diameter of the handlebar 12 and the inner diameter of the tubular shaped member 20 approaches an upper limit of the tolerance range, the frictional resistance between the handlebar 12 and the tubular shaped member 20 can be reduced. As a result, it is possible to easily carry out installation of the grip 10. On the other hand, a short diameter portion (a minor axis portion) of the tubular shaped member 20 is capable of strongly contacting the handlebar 12, and as a result, the state of the tubular shaped member 20 being installed on the handlebar 12 can be maintained.

Further, according to the present embodiment, the through hole 20TH through which the fixing member 40 is inserted is formed in the tubular shaped member 20, and the through hole 20TH extends in the direction D2 of the minor axis of the ellipse. Accordingly, in a state in which the handlebar 12 and the tubular shaped member 20 are in contact, the handlebar 12 and the tubular shaped member 20 can be fixed by the fixing member 40. Therefore, even if at least one of the outer diameter of the handlebar 12 and the inner diameter of the tubular shaped member 20 approaches a lower limit of the tolerance range, it is possible to firmly fix the handlebar 12 and the tubular shaped member 20 while suppressing variations in the attachment strength.

Further, according to the present embodiment, the cover member 22 includes the separated portion 22B that is separated away from the tubular shaped member 20 at the one end part of the tubular shaped member 20 where the through hole 20TH is positioned. Accordingly, in the case that the fixing member 40 is inserted through the through hole 20TH, the operator can turn up the cover member 22 by inserting his or her finger into the separated portion 22B. Further, at a time when the grip 10 is used, the through hole 20TH can be hidden, resulting in a good design.

Further, according to the present embodiment, the concave and convex irregularities 26 are formed on the inner circumferential surface of the separated portion 22B. Accordingly, it is easier to turn up the cover member 22 compared to a case in which the concave and convex irregularities 26 are not formed therein.

Further, according to the present embodiment, the concave portions 30 are formed in the inner surface portion of the tubular shaped member 20 in the direction D1 of the major axis of the ellipse, the concave portions 30 being formed along the longitudinal direction of the tubular shaped member 20. Accordingly, even if the outer diameter of the handlebar 12 approaches the upper limit or the lower limit of the tolerance range, it is possible for the grip 10 to be easily installed without causing a decrease in the attachment strength. Further, even if the type of the handlebar 12 is different, it is possible for the grip 10 to be easily installed without causing a decrease in the attachment strength.

Further, according to the present embodiment, the protruding parts 28 that project out from the inner circumferential surface of the cover member 22 penetrate through the protrusion insertion holes 20RH of the concave portions 30, and extend to the inner side of the tubular shaped member 20. Accordingly, even if a gap exists between the tubular shaped member 20 and the handlebar 12, it is possible to suppress the grip 10 from moving in a swinging manner in the direction D1 of the major axis with the fixing member 40 acting as a fulcrum.

As has been described above, according to the present embodiment, it is possible to realize the grip 10 that can be easily installed without causing a decrease in the attachment strength.

The above-described embodiment may be modified in the following manner.

Exemplary Modification 1

A pair of the through holes 20TH that face each other may be formed in the tubular shaped member 20 along the direction D2 of the minor axis. Alternatively, a pair of the through holes 20TH may be formed at the other end part of the tubular shaped member 20. In either of these cases, the tubular shaped member 20 can be fixed to the handlebar 12 at two locations. As a result, the attachment strength with which the grip 10 is installed on the handlebar 12 can be increased.

Exemplary Modification 2

The bar through hole 12TH need not necessarily be formed in the handlebar 12. In this case, for example, the through hole 20TH of the tubular shaped member 20 may be provided in the form of a screw hole, and using the fixing member 40 such as a set screw that is screw-engaged in the screw hole, the tubular shaped member 20 is capable of being fixed to the handlebar 12.

Exemplary Modification 3

The tubular shaped member 20 may be longer than the cover member 22, or may be approximately the same length as the cover member 22.

Exemplary Modification 4

The cover member 22 may include the separated portion 22B at the other end part of the tubular shaped member 20. Further, the cover member 22 may include the separated portion 22B at each of the one end part of the tubular shaped member 20 and the other end part of the tubular shaped member 20.

Exemplary Modification 5

The protruding parts 28 may be arranged at an interval in the longitudinal direction of the tubular shaped member 20. Further, as shown in FIG. 6, protruding parts 28' that project out from the concave portions 30 may be provided in the concave portions 30. In this case, the protrusion insertion holes 20RH are not formed therein. Further, it is desirable for the tubular shaped member 20 to be made of rubber or the like.

Exemplary Modification 6

The grip 10 may also include a grip heater. In this case, a heat conductive element is arranged between the tubular shaped member 20 and the cover member 22. For example, metal foil such as copper, aluminum, nickel, titanium, or the like, is used for the heat conductive element.

Supplementary Notes

In relation to the above-described embodiment and the exemplary modifications, the following supplementary notes are further disclosed.

Supplementary Note 1

The present disclosure sets forth the grip (10), comprising the tubular shaped member (20) inserted onto the handlebar (12), and the cover member (22) that covers the tubular shaped member, wherein, in a cross section perpendicular to a longitudinal direction of the tubular shaped member, an inner circumferential surface of the tubular shaped member has a shape of an ellipse, the through hole (20TH) through which the fixing member (40) configured to fix the handlebar and the tubular shaped member is inserted is formed in the tubular shaped member, and the through hole extends in the direction (D2) of the minor axis of the ellipse.

In accordance with such features, the short diameter portion (the minor axis portion) of the tubular shaped member is capable of strongly contacting the handlebar, and the long diameter portion (the major axis portion) of the tubular shaped member can tolerate manufacturing errors of the handlebar or the tubular shaped member. Accordingly, the handlebar and the tubular shaped member can be firmly fixed, while the contact surface of the tubular shaped member with respect to the handlebar is made smaller. Further, since the handlebar and the tubular shaped member are fixed in place through the through hole provided on the short diameter side, a structure is brought about which is capable of suppressing floating of the fastening portion (the fixing portion). As a result, it is possible to realize a grip that can be easily installed on the handlebar, and that can maintain the state of being installed on the handlebar.
Supplementary Note 2

In the grip according to Supplementary Note 1, the through hole may be positioned at the end part of the tubular shaped member, and the cover member may include the separated portion (22B) that is separated away from the tubular shaped member at the end part of the tubular shaped member. In accordance with such features, in the case that the fixing member is inserted through the through hole, the operator can turn up the cover member by inserting his or her finger into the separated portion. Further, at a time when the grip is used, the through hole can be hidden, resulting in a good design.
Supplementary Note 3

In the grip according to Supplementary Note 2, the concave and convex irregularities (26) may be formed on the inner circumferential surface of the separated portion. In accordance with this feature, it is easier to turn up the cover member compared to a case in which the concave and convex irregularities are not formed therein.
Supplementary Note 4

In the grip according to Supplementary Note 1, the concave portions (30) may be formed in the inner surface portion of the tubular shaped member in the direction (D1) of the major axis of the ellipse, the concave portions (30) being formed along the longitudinal direction of the tubular shaped member. In accordance with this feature, even if a manufacturing error occurs in the handlebar or the type of the handlebar is different, it is possible for the grip to be easily installed without causing a decrease in the attachment strength.
Supplementary Note 5

In the grip according to Supplementary Note 4, the protruding parts (28) that project out from the inner circumferential surface of the cover member may be provided on the cover member, and the protruding parts may penetrate through the protrusion insertion holes (20RH) formed in the concave tubular shaped member, and may extend to the inner side of the tubular shaped member. In accordance with this feature, even if a gap exists between the tubular shaped member and the handlebar, it is possible to suppress the grip from moving in a swinging manner in the direction of the major axis with the fixing member acting as a fulcrum.
Supplementary Note 6

In the grip according to Supplementary Note 4, the protruding parts (28') that project out from the concave portions may be provided in the concave portions. In accordance with this feature, even if a gap exists between the tubular shaped member and the handlebar, it is possible to suppress the grip from moving in a swinging manner in the direction of the major axis with the fixing member acting as a fulcrum.
Supplementary Note 7

The present disclosure sets forth the handlebar equipped with a grip on which the grip described in any one of Supplementary Notes 1 to 6 is installed.

The present invention is not limited to the above disclosure, and various modifications are possible without departing from the essence and gist of the present invention.

What is claimed is:

1. A grip, comprising:
   a tubular shaped member inserted onto a handlebar; and
   a cover member configured to cover the tubular shaped member,
   wherein, in a cross section perpendicular to a longitudinal direction of the tubular shaped member, an inner circumferential surface of the tubular shaped member has a shape of an ellipse,
   a through hole through which a fixing member configured to fix the handlebar and the tubular shaped member is inserted is formed in the tubular shaped member, and
   the through hole extends in a direction of a minor axis of the ellipse.

2. The grip according to claim 1, wherein:
   the through hole is positioned at an end part of the tubular shaped member; and
   the cover member includes a separated portion that is separated away from the tubular shaped member at the end part of the tubular shaped member.

3. The grip according to claim 2, wherein
   concave and convex irregularities are formed on an inner circumferential surface of the separated portion.

4. The grip according to claim 1, wherein
   a concave portion is formed in an inner surface portion of the tubular shaped member in a direction of a major axis of the ellipse, the concave portion being formed along the longitudinal direction of the tubular shaped member.

5. The grip according to claim 4, wherein:
   a protruding part configured to project out from an inner circumferential surface of the cover member is provided on the cover member; and
   the protruding part penetrates through a protrusion insertion hole formed in the concave portion, and extends to an inner side of the tubular shaped member.

6. The grip according to claim 4, wherein
   a protruding part configured to project out from the concave portion is provided in the concave portion.

7. A handlebar equipped with a grip on which the grip according to claim 1 is installed.

* * * * *